Feb. 23, 1932.　　　J. O. GULLEDGE　　　1,846,198
DUSTING AND SPRAYING MACHINE
Filed Oct. 9, 1926

Inventor
James O. Gulledge
By Lyon & Lyon
Attorneys

Patented Feb. 23, 1932

1,846,198

UNITED STATES PATENT OFFICE

JAMES O. GULLEDGE, OF SANTA ANA, CALIFORNIA

DUSTING AND SPRAYING MACHINE

Application filed October 9, 1926. Serial No. 140,476.

This invention relates to dusting and spraying machines and is more particularly directed to an apparatus or machine for dusting or spraying insecticides, fungicides, or like or similar solutions or dusts onto trees, plants or the like, in order to kill insects, fungus and the like.

Heretofore, in the spraying of trees, plants and the like with solutions, it has been common practice to employ a tank in which the solution is contained, and connected with which tank is a pump for pumping the solution through a hose and spraying nozzle for spraying the same upon the trees. Difficulty has been encountered in moving the tanks from place to place and the number of plants or trees that could be sprayed by a single operator is greatly reduced, due to the difficulty heretofore had with handling the tanks or solution containers.

It is therefore an object of this invention to provide a machine for spraying a treating solution on trees, plants and the like, and which apparatus includes a tank which is mounted upon a truck chassis, and which truck chassis likewise carries a pump which may be operated from a power take-off from the motor of the truck, and which power take-off is provided with a clutch means so that the same may be operated independently of the propulsion of the truck.

Other objects and advantages of this invention will be apparent from the following detailed description of a preferred embodiment thereof, as illustrated in the accompanying drawings, in which drawings.

Figure 1:
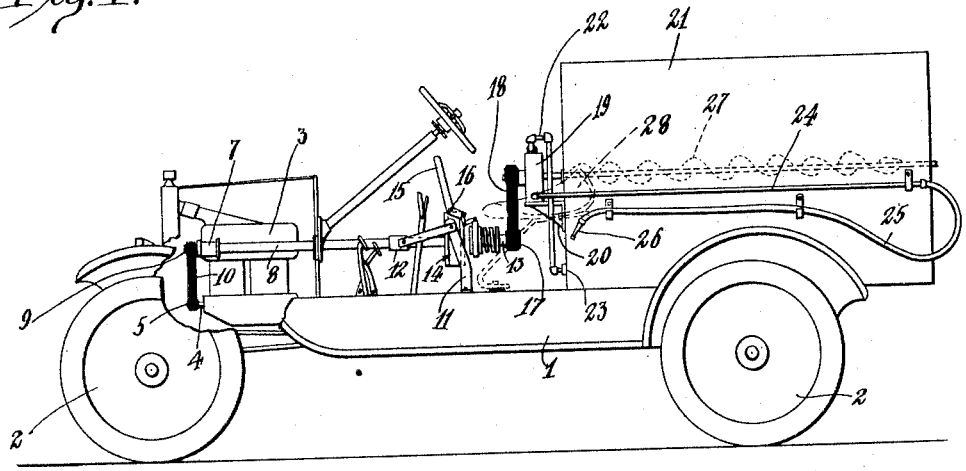
Figure 1 is a side elevation of a dusting and spraying machine embodying this invention.
Figure 2:
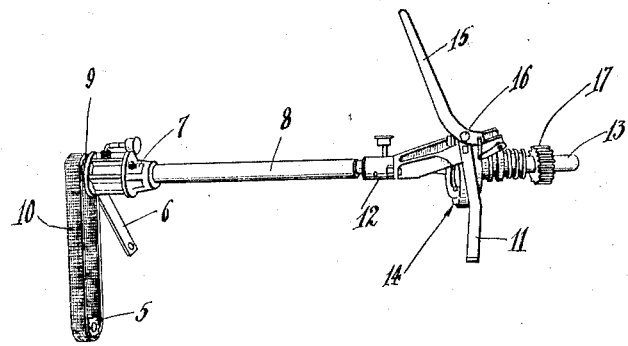
Figure 2 is an enlarged view of the power take-off mechanism embodied in this invention.

In the accompanying drawings, 1 illustrates a motor vehicle chassis, providing wheels 2 and a motor 3. The crank shaft 4 of the motor extends from the forward or front end thereof as is customary for the provision of the cranking mechanism in motor vehicles, and there is secured to the crank shaft 4 a drive sprocket 5, which drive sprocket 5 may be of any suitable or desirable construction.

Secured by means of a bracket 6, carrying a bearing 7 to the chassis 1 of the motor vehicle, is a countershaft 8, which countershaft 8 has, at its forward end, a sprocket 9, which sprocket 9 is adapted to be driven from the sprocket 5 by any suitable or desirable means, such as the chain 10. The counter-shaft 8 is supported at its opposite end by means of a bracket 11, which bracket 11 is secured to the chassis 1 of the motor vehicle in any desirable or suitable manner and supports a bearing 12 in which the countershaft 8 is journaled. The counter-shaft 8 is connected with a shaft 13 by means of a clutch diagrammatically illustrated at 14, which clutch may be of any suitable or desirable type, and a clutch actuating lever 15 is pivotally supported at the pin 16 by the bracket 11. Any suitable or desirable clutch may be employed and it is therefore not deemed necessary for applicant to specifically point out the construction of the clutch 14, the use of which will be obvious to those skilled in the art.

Secured to the shaft 13 is a sprocket 17, which sprocket 17 is connected by means of a chain 18 with a sprocket mounted on the shaft of the pump 19, which pump 19 is supported in any suitable or desirable manner such, for example, as by a plate 20 secured to the tank 21, or the pump 19 may be mounted directly on the motor chassis. The pump 19 may be of any desirable or preferred construction and is connected by means of a conduit 22 with a low point of the tank 21 as illustrated at 23. The outlet of the pump 19 is connected with a conduit 24 to the end of which is secured a flexible hose 25 having a spraying nozzle 26 at its end. An agitator 27 is driven from the shaft 13, either as directly connected with the spraying shaft of the pump 19, as illustrated in the accompanying drawings, or as connected with a separate sprocket or gear connection between the shaft or pump 19 of the shaft 13 as desired, which construction it is believed will be well understood by those skilled in the art. The clutch operating lever 15 is mounted in such a position on the chassis 1 that the same is readily available from the seat 28 of the motor vehicle chassis 1.

It will be obvious from the foregoing, that I have provided a simple and effective means for spraying or dusting trees, and which means are readily transportable, and the driving means for which spraying or dusting machine may be operated independently of the driving or pulling mechanism for the motor vehicle, due to the provision of the clutch 14 which connects the countershaft 8.

The operation of my dusting and spraying machine is:

The tank or dust container 21 is first filled with the desired solution and the truck driven to the place where it is desired to spray the same. The truck is stopped adjacent a tree and the clutch 14 is actuated so that the power take-off, provided by the sprockets 5 and 9, chain 10 and countershaft 8, is operated to drive the pump 19 and agitator 27. The tree is then sprayed by manipulation of the spraying nozzle 26 and it is then possible to actuate the propelling mechanism of the motor vehicle 1 to move the truck to the next tree, either with the clutch 14 engaged or released. The power take-off, provided in accordance with this invention, it will be observed, operates independently of the propelling mechanism for the motor vehicle so that the same may be operated while the motor vehicle is stationary or in motion, thereby enabling me to maintain a definite maximum working pressure for the spraying or dusting of the trees or the like.

Having fully described a preferred embodiment of my invention, it is to be understood that I do not wish to be limited to the exact details herein set forth, which may obviously be varied without departing from the spirit of my invention as set forth in the appended claim.

I claim:

The combination with a motor vehicle chassis including an internal combustion engine, a frame supported on driving and dirigible wheels, a disengageable driving connection from said driving wheels, of a power take-off device from said engine with said driving connection between said engine and driving wheels engaged or disengaged, said power take-off including a countershaft rotatably supported on said chassis, means for connecting said countershaft directly with the drive shaft of said engine at the forward end of said engine, said countershaft extending rearwardly of the chassis to a point adjacent to driving position of said motor vehicle, a driving connection from said countershaft and a clutch mounted in said drive connection adjacent to the driving position of the motor vehicle.

Signed at Santa Ana, California, this 1st day of October, 1926.

JAMES O. GULLEDGE.